Aug. 20, 1963    G. MORESSÉE ETAL    3,101,425
WINDING FOR AXIAL AIR GAP MACHINES
Filed April 26, 1960    3 Sheets-Sheet 1

Inventors
Georges Moressée
Robert Déchet

By Peirce, Scheffler & Parker
Attorneys

Aug. 20, 1963   G. MORESSÉE ETAL   3,101,425
WINDING FOR AXIAL AIR GAP MACHINES
Filed April 26, 1960                    3 Sheets-Sheet 2

Inventors
Georges Moressée
Robert Déchet
By Peirce, Scheffler & Parker
Attorneys Aug. 20, 1963  G. MORESSÉE ETAL  3,101,425
WINDING FOR AXIAL AIR GAP MACHINES
Filed April 26, 1960  3 Sheets-Sheet 3

Inventors
Georges Moressée
Robert Déchet

By Pierce, Scheffler & Parker
Attorneys

United States Patent Office 3,101,425
Patented Aug. 20, 1963

3,101,425
WINDING FOR AXIAL AIR GAP MACHINES
Georges Moressée, Neuilly-sur-Seine, and Robert Déchet, Boulogne-sur-Seine, France, assignors to Normacem S.A., Paris, France, a body corporate of France
Filed Apr. 26, 1960, Ser. No. 24,792
Claims priority, application France May 2, 1959
3 Claims. (Cl. 310—268)

This invention relates generally to an improved armature winding for the rotor of an axial air gap machine, and more particularly to an armature winding having relatively wide and thin coil side conductors longitudinally subdivided by slots to reduce eddy current losses.

In axial air gap machines having disk type rotors it is desired that the coil sides of the armature winding be as thin as possible so that the axial air gap spacing will be reduced to a minimum. In order that the armature winding be capable of conducting a desired quantity of current it is necessary for the coil side conductors to be relatively wide in order that the conductor have the required cross-sectional area. Unfortunately such wide and thin conductors have the disadvantage of susceptibility to Foucault currents and resultant eddy current power losses.

The present invention is directed toward increasing the efficiency of such axial air gap machines and relates to the reduction of Foucault current losses by the provision of longitudinal slots in the flat coil sides of the armature and/or stator windings.

Thus the primary object of the present invention is to provide longitudinal slots in the flat, relatively wide and thin coil sides of armature and/or stator windings of axial air gap machines in order to divide each of the coil sides into two or more flat narrower portions connected in parallel for reducing eddy current losses without increasing the number of conductors.

A more specific object of the invention is to provide a continuous longitudinal slot in an armature winding turn having coil sides mounted on both surfaces of an insulating support disk, said slot extending continuously longitudinally the length of one coil side, through the coil-side-bridging connection which extends around one edge of the support disk, and longitudinally the length of the other coil side, the parts of the continuous conductive path surrounding the slot being arranged to receive magnetic fluxes of equal magnitude and opposite sign so that the total flux equals zero.

Still another object of the invention is to provide a continuous longitudinal slot extending in an armature disk winding turn from one side of the disk and around an edge thereof to the other side of the disk to divide the winding turn into two sections connected in parallel without increasing the number of conductors, the parts of the sections being arranged and connected so that the eddy current in each half of a section will oppose the eddy current in the other half of the same section.

Other objects and advantages of the present invention will become more apparent from a study of the following specification when considered in view of the accompanying drawings wherein.

Figure 1:
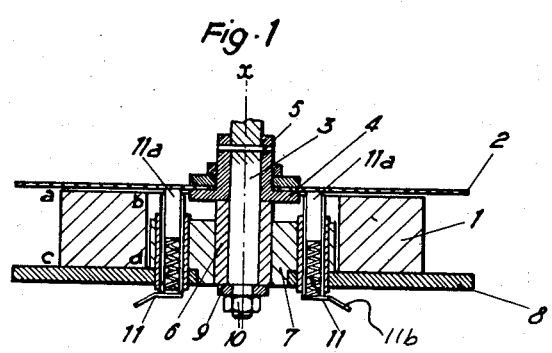
FIG. 1 is a longitudinal sectional view of an axial air gap electrical machine incorporating the present invention.

Referring first more particularly to FIG. 1, the axial air gap machine includes a stator having an annular permanent magnet member 1 defined by the rotation of rectangle $a$—$b$—$d$—$c$ about the axis $x$—$x$. In a known manner, the annular magnet member 1 has a plurality of radially-spaced alternately-arranged north and south polar regions permanently magnetized therein. The annular magnet member 1 is secured to a soft iron yoke plate 8 which serves to close the magnetic circuit. The rotor of the axial air gap machine includes a thin armature disk 2 parallel to and spaced from the adjacent face of the annular magnet member 1 by a thin planar air gap. This armature disk 2 consists of a thin layer of insulating material having secured to both faces thereof the radially-arranged sides of the thin armature winding turns which may be applied in any known manner (as for example, by known printed circuitry techniques). The armature winding disk 2 is secured to the flanged sleeve 4 which in turn is non-rotatably connected to shaft 3 by the pin 5. Shaft 3 is journalled in the self-lubricating sleeve 6 clamped in the ring 7 secured to plate 8.

The armature disk 2 rotates in the primary magnetic field created by the annular magnet member 1 so that the coil sides of the rotary armature winding cut the lines of magnetic flux in a known manner. The thickness of the planar air gap between the disk 2 and the magnet member 1 is adjusted as desired by means of the cooperation of nut 10 threadably secured to the end of shaft 3 with the spacer washer 9. Carbon brushes 11a mounted in brush holders in the stator are biased into rubbing engagement with conductor sides on the lower surface of the rotary armature disk 2 by the springs 11.

Figure 2:
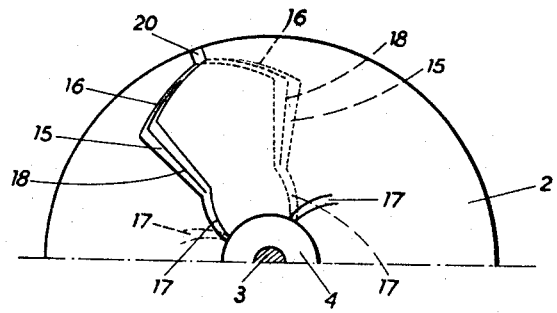
FIG. 2 is a detailed plan view of the disk type armature of the machine of FIG. 1 and shows one full turn of the armature winding thereon.

Referring now to FIG. 2, a turn of the armature winding is shown having one coil side on the upper surface of the armature disk 2 and another coil side on the lower surface thereof. The radially-arranged flat coil side conductors 15 have head portions 16, 17 of a configuration approximating the involutes of a circle. At the outer periphery of the armature disk the winding turn sides on opposite sides of the disk are electrically connected by the bridging portion 20. At the inner periphery of the annular armature disk the ends of the winding turn sides are connected to ends of coil sides of the adjacent armature winding turns on opposite sides of the disk so that a wave-shaped armature winding will be achieved. The stationary carbon brushes 11a connected to the electrical leads 11b of the machine by the springs 11 rub against the head portions 17 of the armature winding coil sides in a known manner.

As is apparent from the drawings, the conductor coil sides of the armature winding are quite thin (so that the thickness of the axial air gap may be kept as small as possible) and are relatively wide (so that they may carry the desired armature current).

Figure 3:
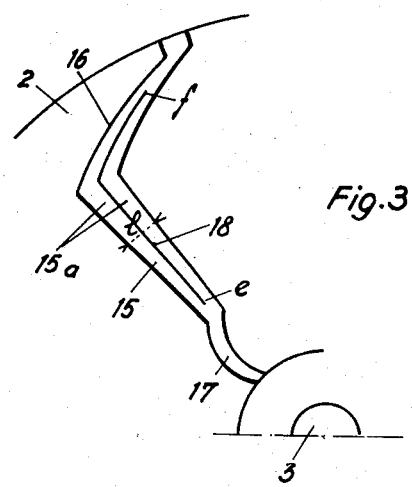
FIG. 3 is an enlarged detailed view of a coil side of one armature winding turn.

Referring more particularly to FIGS. 2 and 3, according to the present invention, the coil sides 15 contain narrow slots 18 which extend completely therethrough to partially divide the coil sides into two parallel strip portions 15a. As shown in FIG. 3, the slots 18 terminate at one end at points "e" and do not extend into the head portions 17 due to the narrowness thereof. At their other ends the slots extend partially into the head portions 16 and terminate at points "f." These slot terminal points "e" and "f" are determined with regard to the negligible harmful effects of the Foucault (eddy) currents in the narrowest parts of the coil side conductors. It should be mentioned that the number of slots 18 in a coil side conductor having a relatively large width could be increased if necessary to achieve proper elimination of eddy current voltages.

Since the coil side conductors are quite thin, the slots 18 may be formed therein by cutting with a sharp knife edge, by etching, by spot vaporization, or by other suitable metal removing method.

Figure 4:
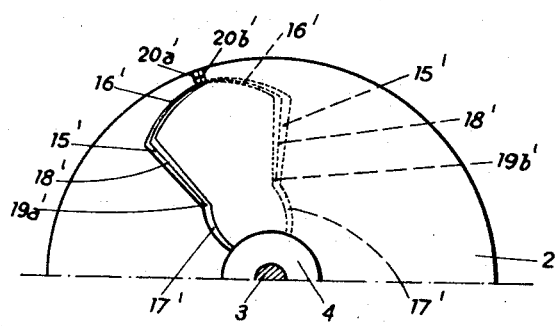
FIG. 4 is a detailed plan view of another armature winding embodiment according to the present invention.

Referring now to the embodiment of FIG. 4, a continuous slot 18′ extends longitudinally the entire length of the coil side portions 15′ and head portions 16′ of the conductors on both sides of the armature disk, the bridging portion 20′ being split by the slot 18′ into portions 20a′ and 20b′ so that halves of a conductor on one face of the armature disk are joined to halves of a conductor on the opposite face of the armature disk. Consequently, between the points 19a′ and 19b′, the armature winding turn is longitudinally divided into two equal parts; the induced voltages of the Foucault currents at 19a′ and 19b′ are in opposition and the eddy current losses will be very substantially reduced. The parts of the narrow eddy current closed conductive path surrounding the slot 18′ are thus subjected to instantaneous magnetic fluxes having an algebraic sum of zero. In other words, the parts of the armature winding continuous path surrounding the slot 18′ receive from a given magnetized polar region of the magnetic member 1 magnetic fluxes which are equal in magnitude and opposite in direction. By causing the slot 18′ to extend from point 19a′ on the armature winding turn on one side of the armature disk to a point 19b′ on the other side of the armature disk, the length of the continuous conductive circuit path surrounding the slot will be a maximum and the eddy current voltage losses will be reduced to a minimum.

Figure 7:
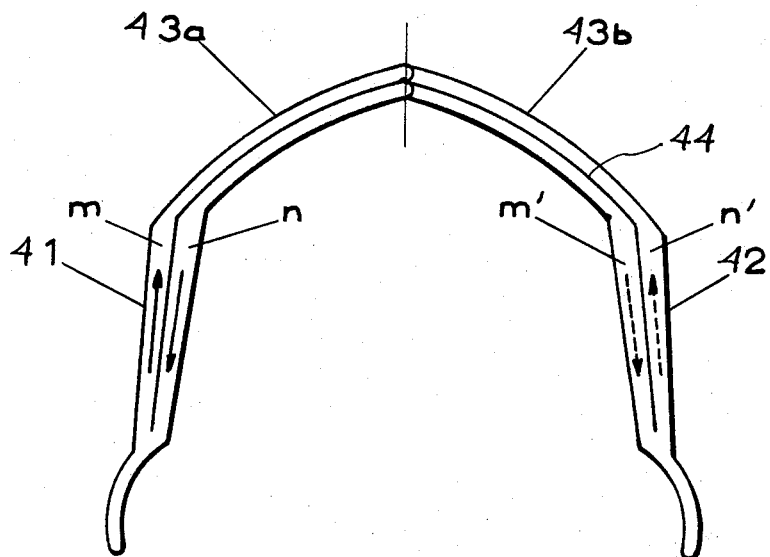
FIG. 7 is a detailed view of a coil turn modification generally similar to that of FIG. 4.
Figure 8:
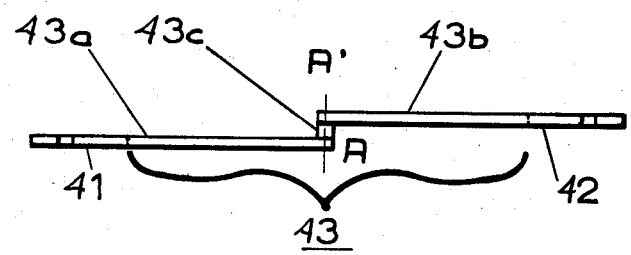
FIG. 8 is an elevational view of the winding embodiment of FIG. 7.

Referring to FIGS. 7 and 8, the armature winding turn includes an active coil side 41 conducting current in the outward radial direction and an active coil side 42 conducting current in the inward radial direction, the coil sides being connected at their adjacent ends by the coil head 43. The coil side 41 and head portion 43a are on one side of the insulating support disk and the coil side 42 and head portion 43b are on the opposite side of the disk (which disk has been omitted from the figure for reasons of clarity). The head portions 43a, 43b are connected by the bridging portion 43c.

The coil sides 41, 42 and the head portion 43 are longitudinally divided along their entire lengths by the slot 44. The halves m and n of coil side 41 and head portion 43a form a narrow U-shaped turn open at end A of head portion 43a, and the halves m′ and n′ of coil side 42 and head portion 43b form a narrow U-shaped turn open at end A′ of head portion 43b.

The instantaneous direction of travel of the Foucault currents developed in coil sides 41 and 42 (which are in magnetic fields of opposite polarities produced by radially-spaced permanently magnetized portions of the magnet member 1) are indicated by the arrows in FIG. 7.

It will be apparent that by connecting the conductor half m with the conductor half n′ and by connecting the conductor half n with the conductor half m′, the Foucault currents will oppose each other and be reduced to a minimum. Consequently due to the opposition shown by the arrows, no Foucault currents will be formed in the continuous conductive path surrounding the slot 44, and any Foucault currents which possibly might be developed will be localized in the respective halves m, n, m′ and n′. The occurrence of such Foucault currents and the corresponding eddy current power losses will be reduced due to the subdivision of the conductor sides by the slot 44.

Figure 5:
FIG. 5 is a longitudinal sectional view of another type of rotary electrical machine of the axial air gap type incorporating the present invention.
Figure 5:
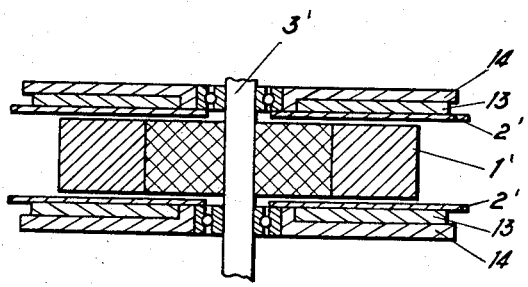
Figure 6:
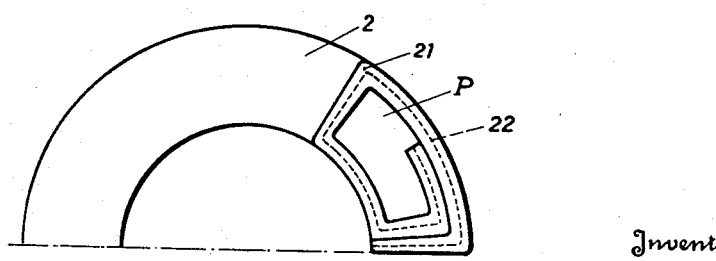
FIG. 6 is a detailed plan view of one of the armature windings of a six-pole alternator in accordance with the present invention.

Referring now to FIG. 5, an axial air gap machine is illustrated having an annular magnet member 1′ secured to the shaft 3′. On each side of the annular magnet member 1′ annular stator winding disks 2′ are arranged so as to surround the shaft 3′. Each disk 2′ is secured to a soft iron ring 13 attached to a plate 14. FIG. 6 is a detailed view of the annular stator disk showing a turn 21 of a localized winding of one of the poles P of a six-pole alternator. For the sake of clarity in the drawing, the continuous slot 22 in the winding 21 has been shown by a dashed line.

As was mentioned above, it is possible to longitudinally subdivide the conductors of the armature windings of any of the described embodiments into a plurality of sections by the formation of more than one slot therein if the width of the conductors should be such as to require it to alleviate the undesired eddy currents.

With regard to distributed windings it will also be very advantageous in the case of winding by concentrated poles, to make the subdivision of the corresponding conductors in continuous fashion, from one pole to the adjacent pole.

While in accordance with the provisions of the patent statutes we have illustrated and described the best forms and embodiments of our invention now known to us, it will be apparent to those skilled in the art that other changes and embodiments may be made in the apparatus described without deviating from the scope of the invention set forth in the following claims.

We claim:

1. In an axial air gap machine including a rotor element and a stator element both having adjacent faces which are parallel and spaced from each other by an axial air gap, and a flat winding on one of said adjacent faces; the improvement wherein the coil sides of said flat winding are relatively thin in the direction normal to the surface of the disk and have a relatively great width, each of said coil sides containing at least one longitudinal slot therein dividing the coil side into two narrower sections electrically connected in parallel whereby Foucault currents in the coil sides and the corresponding eddy current losses created thereby are reduced.

2. In an axial air gap machine having a rotor and a stator, said rotor being spaced from said stator by a planar air gap and consisting of a disk-type armature including an insulating supporting disk having armature winding coil sides on both sides thereof, the improvement wherein said coil sides are relatively thin in the direction normal to the surface of the disk and have a relatively great width, each of said coil sides containing at least one longitudinal slot therein dividing the coil side into two narrower sections electrically connected in parallel whereby Foucault currents in the coil sides and the corresponding eddy current losses created thereby are reduced.

3. In an axial air gap machine having a rotor and a stator, said rotor being spaced from said stator by a planar air gap and being constituted by a disk-type armature including a supporting disk of insulating material having armature winding coil sides on opposite faces thereof, said coil sides being relatively thin in the direction normal to the surface of the disk and being of relatively great width, a first coil side on one face of said disk being connected to a second coil side on the opposite face of said disk by a bridging connection adjacent an edge of said disk and said coil sides being arranged to receive instantaneous magnetic fluxes from said stator which are equal in magnitude and opposite in sign, the improvement wherein said first and second coil sides as well as said bridging connection are divided longitudinally into sections by a continuous slot extending longitudinally through said first coil side and through said bridging connection and through said second coil side, the longitudinally divided sections of said first coil side being connected via said longitudinally divided bridging connection to the longitudinally divided sections of said second coil side such that the eddy current induced in each section will flow in a direction in opposition to the direction of flow of eddy current in the section to which it is connected.

References Cited in the file of this patent
UNITED STATES PATENTS
2,970,238    Swiggett ---------------- Jan. 31, 1961